(12) United States Patent
Hattori et al.

(10) Patent No.: US 10,901,561 B2
(45) Date of Patent: Jan. 26, 2021

(54) CONDUCTIVE FILM, TOUCH PANEL SENSOR, AND TOUCH PANEL

(71) Applicant: FUJIFILM Corporation, Tokyo (JP)

(72) Inventors: Akiko Hattori, Kanagawa (JP); Akihiko Ohtsu, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/274,540

(22) Filed: Feb. 13, 2019

(65) Prior Publication Data
US 2019/0179453 A1 Jun. 13, 2019

Related U.S. Application Data

(63) Continuation of application No. PCT/JP2017/026949, filed on Jul. 26, 2017.

(30) Foreign Application Priority Data

Sep. 12, 2016 (JP) .................. 2016-177616

(51) Int. Cl.
G06F 3/041 (2006.01)
G06F 3/044 (2006.01)
H01B 5/14 (2006.01)

(52) U.S. Cl.
CPC .............. G06F 3/044 (2013.01); G06F 3/041 (2013.01); H01B 5/14 (2013.01); G06F 2203/04103 (2013.01); G06F 2203/04112 (2013.01)

(58) Field of Classification Search
CPC .............. G06F 3/044; G06F 3/041; G06F 2203/04112; G06F 2203/04103; H01B 5/14
See application file for complete search history.

(56) References Cited

U.S. PATENT DOCUMENTS 8,179,381 B2 5/2012 Frey et al.
8,780,567 B2 7/2014 Hwang et al.
(Continued)

FOREIGN PATENT DOCUMENTS

JP 2011-513846 A 4/2011
JP 201429614 A 2/2014
(Continued)

OTHER PUBLICATIONS

International Search Report issued in PCT/JP2017/026949; dated Aug. 29, 2017.
(Continued)

Primary Examiner — Towfiq Elahi
(74) Attorney, Agent, or Firm — Studebaker & Brackett PC

(57) ABSTRACT

An object of the invention is to provide a conductive film having excellent visibility. Another object of the invention is to provide a touch panel sensor and a touch panel. A conductive film according to the embodiment of the invention includes a substrate and a conductive portion which is disposed on the substrate and composed of thin metal wires having a line width of 0.5 µm or greater and less than 2 µm, the thin metal wires form a mesh pattern, a line width L µm of the thin metal wires and an opening ratio A % of the mesh pattern satisfy a relationship represented by Formula (I), and a reflectivity of the thin metal wires at a wavelength of 550 nm is 80% or less. Formula (I): $70 \leq A < (10-L/15)^2$.

7 Claims, 2 Drawing Sheets

(56) References Cited

U.S. PATENT DOCUMENTS

| | | | |
|---|---|---|---|
| 2009/0218925 A1* | 9/2009 | Kwak | H01L 27/3276 313/243 |
| 2009/0219257 A1* | 9/2009 | Frey | G06F 3/045 345/173 |
| 2012/0031746 A1 | 2/2012 | Hwang et al. | |
| 2013/0294037 A1* | 11/2013 | Kuriki | H05K 9/00 361/748 |
| 2014/0063374 A1 | 3/2014 | Kuriki | |
| 2014/0070251 A1* | 3/2014 | Jen | H01L 33/60 257/98 |
| 2017/0123530 A1 | 5/2017 | Takeyasu et al. | |

FOREIGN PATENT DOCUMENTS

| | | |
|---|---|---|
| JP | 5486536 B2 | 5/2014 |
| JP | 2014523599 A | 9/2014 |
| JP | 2014194655 A | 10/2014 |
| JP | 2015-064790 A | 4/2015 |
| JP | 2015125629 A | 7/2015 |
| JP | 2015143978 A | 8/2015 |
| JP | 2015182422 A | 10/2015 |
| JP | 2015195004 A | 11/2015 |
| JP | 5839541 B2 | 1/2016 |
| KR | 20110127101 A | 11/2011 |
| KR | 20120091408 A | 8/2012 |

OTHER PUBLICATIONS

Written Opinion issued in PCT/JP2017/026949; dated Aug. 29, 2017.

An Office Action mailed by the Korean Patent Office dated Sep. 9, 2020, which corresponds to Korean Patent Application No. 10-2019-7005927 with English Translation.

Office Action; "Notice of Reasons for Refusal", mailed by the Japanese Patent Office dated Dec. 8, 2020, which corresponds to Japanese Patent Application No. 2019-234227 and is related to U.S. Appl. No. 16/274,540; with English language translation.

* cited by examiner

CONDUCTIVE FILM, TOUCH PANEL SENSOR, AND TOUCH PANEL

CROSS-REFERENCE TO RELATED APPLICATIONS

This application is a Continuation of PCT International Application No. PCT/JP2017/026949 filed on Jul. 26, 2017, which claims priority under 35 U.S.C. § 119(a) to Japanese Patent Application No. 2016-177616 filed on Sep. 12, 2016. The above application is hereby expressly incorporated by reference, in its entirety, into the present application.

BACKGROUND OF THE INVENTION

1. Field of the Invention

The present invention relates to a conductive film, a touch panel sensor, and a touch panel.

2. Description of the Related Art

Conductive films in which a conductive portion composed of thin metal wires is disposed on a substrate have been used for various purposes. For example, in recent years, a demand for conductive films for a capacitance type touch panel sensor enabling multipoint detection has been rapidly increased with an increase in rate of touch panel mounting on cell phones or portable game devices.

ITO films produced using an indium tin oxide (ITO) have been widely used since the conductive films described above are required to have excellent conductive properties and transparency.

Under such circumstances, conductive films having thin metal wires have attracted attention as an alternative to the ITO film from the viewpoint of low electrical resistance, low cost, and the like.

As the conductive films having thin metal wires described above, for example, U.S. Pat. No. 8,179,381B discloses that a pattern in which a line width of a conductive portion (conductor trace width) is 0.5 to 5 μm and an opening ratio (open area fraction) is 90.5% to 99.5% is provided (claim 1).

JP5839541B discloses "a conductive sheet having a plurality of conductive patterns arranged in one direction, in which the conductive pattern is formed by combining a plurality of first lattices of thin metal wires and a plurality of second lattices of thin metal wires which have a larger size than the first lattice, second lattice portions composed of the second lattices are arranged in the one direction, and first lattice portions which are composed of the first lattices, arranged in a direction substantially orthogonal to the one direction, and provided at predetermined intervals are arranged in a state of being non-connected with the second lattice portions".

SUMMARY OF THE INVENTION

While conductive films in which thin metal wires are formed have the above-described advantages, a mesh pattern of the thin metal wires is easily visually recognized by an observer in a case where the conductive film is applied to a touch panel (reduction in visibility). Such a phenomenon in which the thin metal wires are visually recognized by the observer may be called "wire exposure" or "bone exposure".

Therefore, in order to improve the visibility of the thin metal wires, a method of reducing the line width of the thin metal wires to the extent described in U.S. Pat. No. 8,179,381B and JP5839541B is considered.

The inventors have examined a conductive film in which thin metal wires having a small line width are formed as described in U.S. Pat. No. 8,179,381B and JP5839541B, and found that the visibility of the thin metal wires is not sufficiently improved, and there is room for improvement.

An object of the invention is to provide a conductive film having excellent visibility. Another object of the invention is to provide a touch panel sensor and a touch panel.

As a result of intensive studies on the above-described problem, the inventors have found that a conductive film having excellent visibility can be obtained in a case where the line width of the thin metal wires and the opening ratio of the mesh pattern composed of the thin metal wires satisfy a predetermined relationship, and the reflectivity of the thin metal wires is not higher than a predetermined value, and completed the invention.

That is, the inventors have found that the above-described problem can be solved with the following configuration.

[1] A conductive film comprising: a substrate, and a conductive portion which is disposed on the substrate and composed of thin metal wires having a line width of 0.5 μm or greater and less than 2 μm, in which the thin metal wires form a mesh pattern, a line width L μm of the thin metal wires and an opening ratio A % of the mesh pattern satisfy a relationship represented by Formula (I), and a reflectivity of the thin metal wires at a wavelength of 550 nm is 80% or less.

$$70 \leq A < (10 - L/15)^2 \qquad \text{Formula (I):}$$

[2] The conductive film according to [1], in which the opening ratio A is 95.0% to 99.6%.

[3] The conductive film according to [1] or [2], in which the reflectivity of the thin metal wires at a wavelength of 550 nm is 20% to 40%.

[4] A touch panel sensor comprising: the conductive film according to any one of [1] to [3].

[5] A touch panel comprising: the touch panel sensor according to [4].

According to the invention, it is possible to provide a conductive film having excellent visibility as shown below. Furthermore, according to the invention, it is possible to provide a touch panel sensor and a touch panel.

DESCRIPTION OF THE PREFERRED EMBODIMENTS

Figure 1:
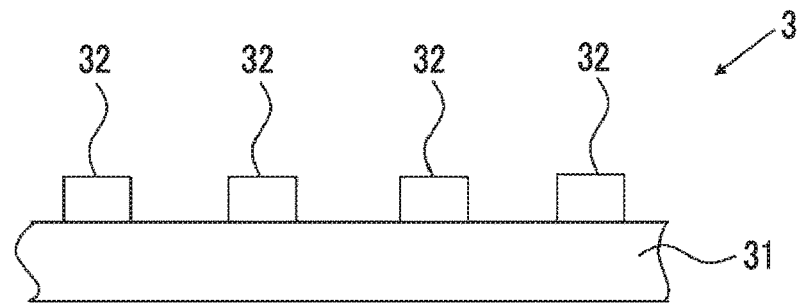
FIG. 1 is a partial cross-sectional view showing a cross-section of a conductive film.

Hereinafter, the invention will be described in detail.

The following descriptions of constituent elements are given based on representative embodiments of the invention, but the invention is not limited thereto.

In this specification, a numerical value range expressed using the expression "to" means a range including numerical values before and after "to" as a lower limit value and an upper limit value.

In this specification, the term "actinic rays" or "radiation" means, for example, a bright line spectrum of a mercury lamp, far ultraviolet rays represented by excimer laser, extreme ultraviolet rays (extreme ultraviolet lithography (EUV) light), X-ray, or electron beams. In this specification, the term "light" means actinic rays or radiation. In this specification, unless stated otherwise, the term "exposure" includes not only exposure to a mercury lamp, far ultraviolet rays represented by excimer laser, X-ray, EUV light, or the like, but also drawing with particle beams such as electron beams and ion beams.

[Conductive Film]

A conductive film according to the embodiment of the invention will be described with reference to the drawings. In the drawings used in the following description, the scale is appropriately changed for each constituent element in order to make the size of each constituent element (member) recognizable in the drawing. In the conductive film according to the embodiment of the invention, the numbers, shapes, and size ratios of the constituent elements, and the relative positional relationships between the constituent elements are not limited to those shown in the drawings.

FIG. 1 is a partial cross-sectional view showing a cross-section of a conductive film 3. As shown in FIG. 1, the conductive film 3 has a substrate 31 and a conductive portion 32 disposed on the substrate.

In the example of FIG. 1, the conductive portion 32 is disposed on one surface of the substrate 31. However, the conductive portion 32 is not limited thereto, and the conductive portions 32 may be disposed on both surfaces of the substrate 31.

In the example of FIG. 1, the conductive portion 32 is disposed on a part of the surface of the substrate 31, but the conductive portion 32 is not limited thereto, and the conductive portion 32 may be disposed on the entire surface of the substrate 31.

The type of the substrate 31 is not particularly limited, but a substrate having flexibility (preferably an insulating substrate) is preferable, and a resin substrate is more preferable.

The substrate 31 preferably transmits 60% or more of visible light (wavelength: 400 to 800 nm), more preferably 80% or more, even more preferably 90% or more, and particularly preferably 95% or more.

Examples of the material constituting the substrate 31 include polyethersulfone-based resins, polyacrylic resins, polyurethane-based resins, polyester-based resins (polyethylene terephthalate and polyethylene naphthalate), polycarbonate-based resins, polysulfone-based resins, polyamide-based resins, polyarylate-based resins, polyolefin-based resins, cellulose-based resins, polyvinyl chloride-based resins, and cycloolefin-based resins. Among these, cycloolefin-based resins are preferable.

The thickness of the substrate 31 is not particularly limited, but is preferably 0.05 to 2 mm, and more preferably 0.1 to 1 mm in view of a balance between handleability and a reduction in thickness.

The substrate 31 may have a double-layer structure, and for example, it may have a functional film as one layer of the substrate. The substrate 31 itself may be a functional film.

As the substrate 31, a film having low retardation is preferably used from the viewpoint that low birefringence suitable for a display device can be achieved. Specifically, the retardation is preferably 0.1 to 20 nm. Examples of the substrate 31 include an ARTON film (trade name, manufactured by JSR Corporation, cycloolefin-based resin film) and ZEONOR film (trade name, manufactured by Zeon Corporation, cycloolefin-based resin film).

Figure 2:
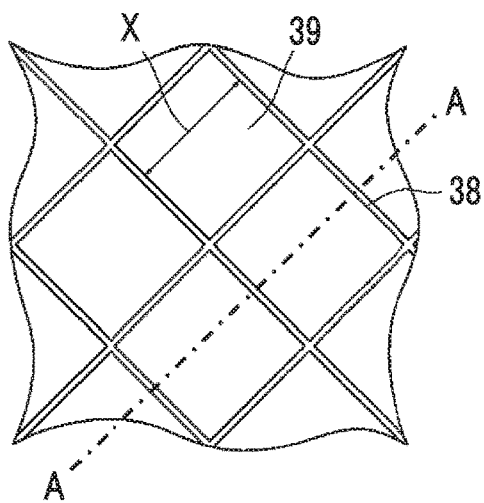
FIG. 2 is a partial enlarged plan view of a conductive portion of the conductive film.

FIG. 2 is a partial enlarged plan view of the conductive portion 32 of the conductive film 3. As shown in FIG. 2, the conductive portion 32 is formed of a mesh pattern composed of thin metal wires 38. Specifically, the thin metal wires 38 are arranged in a mesh shape (lattice shape), and openings 39 of the mesh pattern are partitioned by the thin metal wires 38.

A length X of one side of the opening 39 represents an interval between the thin metal wires 38 arranged adjacent to each other, and is also referred to as a pitch size X in this specification. The pitch size X represents the shortest width of the opening 39 positioned between the thin metal wires 38 opposed to each other in a case where the conductive portion 32 is viewed in plan view as shown in FIG. 2.

In FIG. 2, the opening 39 of the mesh pattern has a substantially diamond shape. However, the opening 39 may have other shapes such as polygonal shapes (for example, triangle, quadrangle, hexagon, and random polygon). In addition, the shape of one side may be a curved shape or an arc shape, other than a linear shape. In a case of an arc shape, for example, two sides opposed to each other may have an outwardly convex arc shape, and the other two sides opposed to each other may have an inwardly convex arc shape. In addition, each side may have a wavy line shape in which outwardly convex arcs and inwardly convex arcs are continuously formed. Each side may have a sine curve shape.

Figure 3:
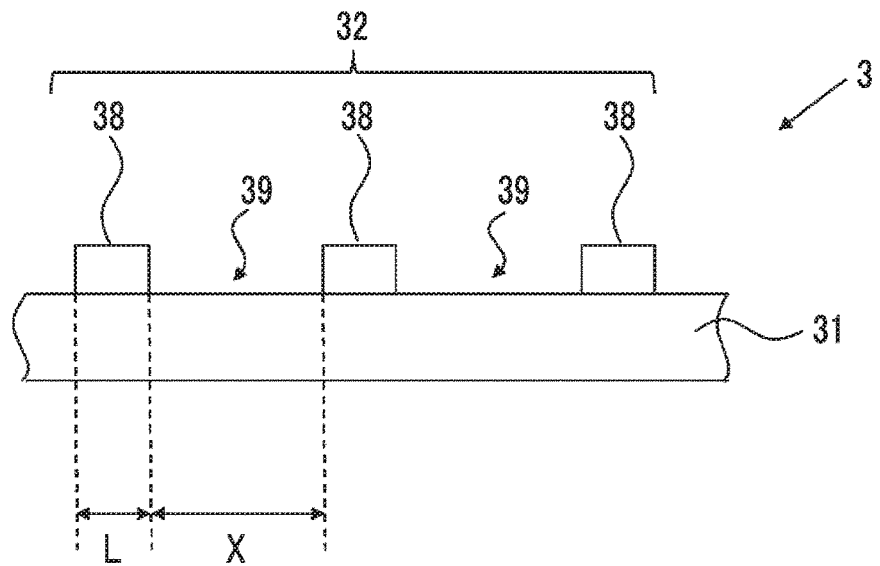
FIG. 3 is a partial enlarged cross-sectional view of thin metal wires.

FIG. 3 is a partial enlarged cross-sectional view of the thin metal wires 38. Specifically, FIG. 3 is a partial enlarged view of a cross-section taken along the line A-A of FIG. 2.

As shown in FIG. 3, the thin metal wires 38 having a line width L are arranged on the substrate 31 at intervals of a pitch size X.

As a result of studies by the inventors, it has been found that in a case where the line width L (μm) of the thin metal wires and an opening ratio A (%) of the mesh pattern satisfy the relationship represented by Formula (I) and the reflectivity of the thin metal wires at a wavelength of 550 nm is 80% or less, the thin metal wires have excellent visibility (that is, the observer is hard to visually recognize the thin metallic wires).

$$70 \leq A < (10 - L/15)^2 \qquad \text{Formula (I):}$$

In Formula (I), L is 0.5 or greater and less than 2 (that is, the line width L of the thin metal wires 38 is 0.5 μm or greater and less than 2 μm).

Here, the opening ratio A is calculated from the pitch size X and the line width L. For example, in reducing the opening ratio A, the thin metal wires 38 may be densely arranged to reduce the pitch size X. In a case where the pitch size X of the opening is reduced as above, a phenomenon that the thin metal wires which appear to be densely arranged by human eyes are hardly visually recognized occurs due to the influence of the visual recognition transfer function (VTF). Therefore, it can be said that it is preferable to reduce the opening ratio A from the viewpoint of visibility.

It has been found that in a case where the line width L is 2 µm or greater, a moire phenomenon occurs and the visibility is easily reduced (that is, the mesh pattern is easily visually recognized), and based on this, the line width L is set to less than 2 µm.

The inventors have conducted studies based on the above findings to improve the visibility (that is, to make it difficult to visually recognize the metallic wiring), and found that in a case where the line width L is as small as less than 2 µm, and the opening ratio A and the line width L are set to satisfy the relationship represented by Formula (I), the visibility of the metallic wiring can be improved.

Furthermore, as a result of intensive studies by the inventors, it has been found that in a case where the reflectivity of the thin metal wires at a wavelength of 550 nm is 80% or less, the total quantity of reflected light reflected from the thin metal wires is reduced, and thus the visibility of the thin metal wires can be improved.

It is thought that both the effect obtained by satisfying Formula (I) and the effect obtained by setting the reflectivity of the thin metal wires to a predetermined value or less act synergistically, so that the thin metal wires have excellent visibility.

The line width L of the thin metal wires 38 is less than 2.0 µm, preferably 1.5 µm or less, and more preferably 1.0 µm or less. The lower limit value of the line width L of the thin metal wires 38 is 0.5 µm or greater.

In a case where the line width L of the thin metal wires 38 is less than 2.0 µm, a touch panel's user is hard to visually recognize the thin metal wires 38 in a case where the conductive film is applied to a touch panel sensor. In a case where the line width L of the thin metal wires 38 is 0.5 µm or greater, the conductive properties of the conductive film 3 are improved.

In the invention, the line width L of the thin metal wire means the maximum line width in a cross-section in a width direction of the thin metal wire (a cross-section orthogonal to the extending direction of the thin metal wire).

In addition, the line width L of the thin metal wire means a line width which is measured as follows: the thin metal wire is embedded in the resin together with the whole substrate, and cut in a width direction (a direction orthogonal to the extending direction of the thin metal wire) using an ultramicrotome, carbon is deposited on the obtained cross-section, and then the carbon-deposited surface is observed using a scanning electron microscope (S-550, manufactured by Hitachi High-Technologies Corporation) to measure the line width.

The thickness of the thin metal wire 38 is not particularly limited, but in general, the thickness is preferably 10 to 10,000 nm, and more preferably 300 to 1,100 nm. In a case where the thickness of the thin metallic wire 38 is within the above range, the conductive properties and visibility of the conductive film 3 are improved.

The thickness of the thin metal wire means a thickness of the thin metal wire which is measured as follows: the thin metal wire is embedded in the resin together with the whole substrate, and cut in a width direction (a direction orthogonal to the extending direction of the thin metal wire) using an ultramicrotome, carbon is deposited on the obtained cross-section, and then the carbon-deposited surface is observed using a scanning electron microscope (S-550, manufactured by Hitachi High-Technologies Corporation) to measure the line width.

The aspect ratio (thickness/line width) of the thin metal wire 38 is preferably 0.01 or greater, more preferably 0.1 or greater, and even more preferably 0.5 or greater. The lower limit value of the aspect ratio is preferably 10 or less, and more preferably 2.0 or less.

In a case where the aspect ratio is 0.1 or greater, the volume is increased while the small line width of the thin metal wire 38 is maintained. Accordingly, the resistance of the conductive film 3 can be reduced. In a case where the aspect ratio is 10 or less, reflected light from a side surface of the thin metal wire can be suppressed, and thus good visibility can be maintained.

In addition, the thin metal wire 38 preferably has a semicircular, rectangular, tapered, or reverse tapered cross-sectional shape. From the viewpoint of visibility, a semicircular or reverse tapered cross-sectional shape is more preferable. In a case where the cross-sectional shape is semicircular or reverse tapered, reflected light from a side surface of the thin metal wire 38 can be suppressed, and thus wire exposure is suppressed and good visibility can be secured.

The opening ratio A is 70% or greater, preferably 95% or greater, and more preferably 96% or greater. In a case where the opening ratio A is 70% or greater, a transmittance required for a touch panel of a display device is easily set in a case where the conductive film 3 is applied to the display device.

The upper limit value of the opening ratio A may be less than the value on the right side of Formula (I).

Here, the opening ratio A is the ratio (%) of the area of the openings 39 to the area where the conductive portion 32 is present when the conductive film 3 is viewed in a direction in which the thin metal wires 38 are laminated on the substrate 31, and represents a non-occupation ratio of the thin metal wires 38 in the area where the conductive portion 32 is present.

As a method of calculating the opening ratio A, first, in a quadrangular region of 35 mm in length×35 mm in width at a central portion where the conductive portion 32 of the conductive film 3 is present, a central region of 30 mm×30 mm is divided into 9 regions of 10 mm×10 mm. Next, the opening ratio in each of the divided regions is calculated, and the value obtained by arithmetically averaging the opening ratios is defined as the opening ratio A (%) of the mesh pattern.

The opening ratio A is particularly preferably 95.0% to 99.6% in the conductive film 3. Accordingly, the visibility of the thin metal wires 38 of the conductive film 3 is improved.

The length X ("pitch size X") of one side of the opening 39 is preferably less than 150 µm, more preferably 140 µm or less, and even more preferably 130 µm or less. In addition, the lower limit value is generally preferably 30 µm or greater.

In a case where the pitch size X is less than 150 µm, the visibility of the thin metal wires 38 can be improved due to the influence of the visual recognition transfer function (VTF).

The reflectivity of the thin metal wires 38 at a wavelength of 550 nm is 80% or less, preferably 20% to 40%, and more preferably 25% to 35%.

In the invention, the reflectivity of the thin metal wire refers to a reflectivity of the surface on the visual recognition side.

In the invention, the reflectivity is measured in examples to be described later.

The reflectivity of the thin metal wire can be adjusted by, for example, a material of the thin metal wire and a thin metal wire forming method to be described later.

Examples of the material of the thin metal wire 38 include metals such as copper, chromium, lead, nickel, gold, silver, tin, and zinc, and alloys of the above metals.

Among these, copper or an alloy thereof, or chromium or an alloy thereof is preferably contained in at least the surface on the visual recognition side of the thin metal wire 38 in view of further reducing the reflectivity of the thin metal wire and obtaining excellent conductive properties.

The thin metal wires 38 may be a laminated structure formed by laminating two or more layers.

The conductive film 3 can be used for various purposes. For example, it can be used as various electrode films, heat generating sheets, and printed wiring boards. Among these, the conductive film 3 is preferably used as a touch panel sensor, and more preferably used as a capacitance type touch panel sensor. In a touch panel including the conductive film 3 as a touch panel sensor, the thin metal wires are hardly visually recognized.

Examples of the configuration of the touch panel include the touch panel module described in paragraphs 0020 to 0027 of JP2015-195004A, and the above content is incorporated into this specification.

[Method of Manufacturing Conductive Film]

The method of manufacturing the above-described conductive film is not particularly limited, and known forming methods can be used. General examples thereof include a method of forming a pattern of a conductive ink using an inkjet method or a screen printing method, a method of applying a conductive ink after patterning of roughness of a wiring pattern on a substrate, a method including forming a metal film by vacuum film formation such as a sputtering method or a vapor deposition method, and patterning the metal film using a photolithography method, a method using a self-forming transparent conductive material, a method of forming thin metal wires by electroless plating after patterning of a plating base layer, and a method of forming thin metal wires by electroplating by a semiadditive method.

In a case where a semiadditive method is used, for example, the manufacturing is performed by the following method. That is, the method of manufacturing a conductive film according to the embodiment of the invention includes the following steps.

(1) A step of forming a first metal film on a substrate (first metal film forming step)

(2) A step of forming a resist film having openings in a region where thin metal wires are formed on the first metal film (resist film forming step)

(3) A step of forming a second metal film in the openings on the first metal film (second metal film forming step)

(4) A step of removing the resist film (resist film removing step)

(5) A step of forming a conductive portion composed of thin metal wires by removing a part of the first metal film using the second metal film as a mask (conductive portion forming step)

Hereinafter, the procedure of the steps will be described in detail.

[First Metal Film Forming Step]

Figure 4A:
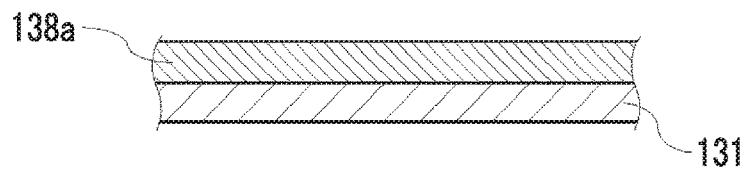
FIG. 4A is a schematic cross-sectional view for illustrating a first metal film forming step.

FIG. 4A is a schematic cross-sectional view for illustrating the first metal film forming step. By performing the first metal film forming step, a first metal film 138a is formed on a substrate 131.

The first metal film 138a functions as a seed layer and/or a base substrate metal layer (base adhesion layer).

In the example of FIG. 4A, the case where the first metal film 138a is a single layer is shown, but the invention is not limited thereto. For example, the first metal film 138a may be a laminated structure formed by laminating two or more layers. In a case where the first metal film 138a is a laminated structure, the lower layer on the side of the substrate 131 side preferably functions as a base substrate metal layer (base adhesion layer), and the upper layer on the side of a second metal film 138b (to be described later) preferably functions as a seed layer.

Since the substrate 131 corresponds to the above-described substrate 31, the description thereof will be omitted.

Since the material of the first metal film 138a is similar to the material of the thin metal wires 38 mentioned above, the description thereof will be omitted.

The thickness of the first metal film 138a is not particularly limited, but in general, the thickness is preferably 30 to 300 nm, and more preferably 40 to 100 nm.

In a case where the thickness of the first metal film 138a is 300 nm or less, the manufacturing suitability in the conductive portion forming step (particularly, etching process) to be described later is improved, and thus thin metal wires having a predetermined line width are easily obtained with little variation in line width.

The method of forming the first metal film 138a is not particularly limited, and known forming methods can be used. Among these, a sputtering method or a vapor deposition method is preferable in view of the fact that a layer having a more dense structure is easily formed.

[Resist Film Forming Step]

Figure 4B:
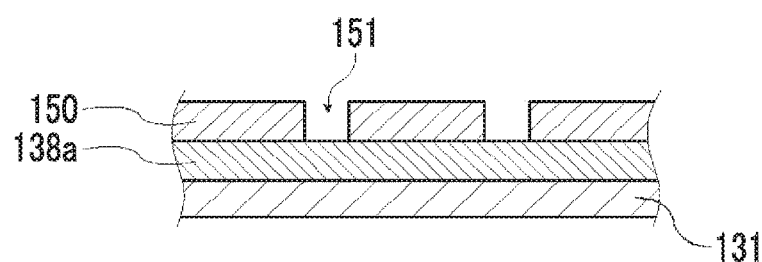
FIG. 4B is a schematic cross-sectional view for illustrating a resist film forming step.

FIG. 4B is a schematic cross-sectional view for illustrating the resist film forming step. By performing this step, a resist film 150 is formed on the first metal film 138a.

The resist film 150 is provided with openings 151 in a region where thin metal wires are formed.

The region of the openings 151 in the resist film 150 can be appropriately adjusted according to the region where the thin metal wires are to be arranged. Specifically, in a case where thin metal wires arranged in a mesh shape are formed, a resist film 150 having mesh-like openings is formed. In general, the openings are formed in a thin wire shape so as to match the thin metal wires.

The line width of the opening 151 is preferably less than 2.0 μm, more preferably 1.5 μm or less, and even more preferably 1.0 μm or less. In a case where the line width of the opening is less than 2.0 μm, thin metal wires 138 having a small line width can be obtained. Particularly, in a case where the line width of the opening 151 is 1.5 μm or less, the line width of thin metal wires 138 to be obtained is further reduced, and thus it is more difficult for a user to visually recognize the thin metal wires 138.

The line width of the opening 151 means a width of the thin wire in a direction orthogonal to the extending direction of the thin wire portion of the opening 151. Through the steps to be described later, a thin metal wire 138 having a line width corresponding to the line width of the opening 151 is formed.

The method of forming the resist film 150 on the first metal film 138a is not particularly limited, and known resist film forming methods can be used. Examples thereof include a method including the following steps.

(a) A step of forming a resist film forming composition layer by applying a resist film forming composition to the first metal film 138a (b) A step of exposing the resist film forming composition via a photomask having patterned openings.

(c) A step of obtaining a resist film 150 by developing the resist film forming composition after the exposure.

A step of heating the resist film forming composition layer and/or the resist film 150 may be further included between the steps (a) and (b), the steps (b) and (c), and/or after the step (c).

Step (a)

Any known positive type radiation-sensitive composition can be used as the resist film forming composition which can be used in the step (a).

The method of applying the resist film forming composition to the first metal film 138a is not particularly limited, and known coating methods can be used.

Examples of the method of applying the resist film forming composition include a spin coating method, a spray method, a roller coating method, and a dipping method.

After the resist film forming composition layer is formed on the first metal film 138a, the resist film forming composition layer may be heated. Through the heating, the unnecessary solvent remaining on the resist film forming composition layer can be removed, and the resist film forming composition layer can be made uniform.

The method of heating the resist film forming composition layer is not particularly limited, and examples thereof include a method of heating a substrate.

The heating temperature is not particularly limited, but in general, the heating temperature is preferably 40° C. to 160° C.

The thickness of the resist film forming composition layer is not particularly limited, but in general, the thickness after drying is preferably 1.0 to 5.0 µm.

Step (b)

The method of exposing the resist film forming composition layer is not particularly limited, and known exposure methods can be used.

Examples of the method of exposing the resist film forming composition layer include a method of irradiating the resist film forming composition layer with actinic rays or radiation via a photomask having patterned openings. The exposure amount is not particularly limited, but in general, it is preferable to perform the irradiation at 10 to 50 mW/cm² for 1 to 10 seconds.

In general, the line width of the patterned openings of the photomask which is used in the step (b) is preferably less than 2.0 µm, more preferably 1.5 µm or less, and even more preferably 1.0 µm or less.

The resist film forming composition layer after the exposure may be heated. The heating temperature is not particularly limited, but in general, the heating temperature is preferably 40° C. to 160° C.

Step (c)

The method of developing the resist film forming composition layer after the exposure is not particularly limited, and known developing methods can be used.

Examples of the known developing methods include a method using a developer containing an organic solvent or an alkali developer.

Examples of the developing method include a dipping method, a paddle method, a spray method, and a dynamic dispensing method.

The resist film 150 after the development may be washed using a rinsing liquid. The rinsing liquid is not particularly limited, and known rinsing liquids can be used. Examples of the rinsing liquid include an organic solvent and water.

[Second Metal Film Forming Step]

Figure 4C:
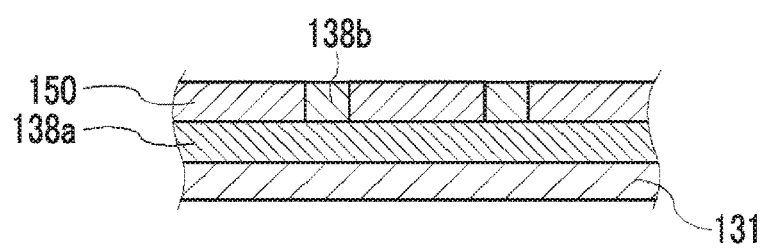
FIG. 4C is a schematic cross-sectional view for illustrating a second metal film forming step.

FIG. 4C is a schematic cross-sectional view for illustrating the second metal film forming step. Through this step, a second metal film 138b is formed in the openings 151 of the resist film 150 on the first metal film 138a. As shown in FIG. 4C, the second metal film 138b is formed to fill the openings 151 of the resist film 150.

The second metal film 138b is preferably formed by a plating method.

As the plating method, known plating methods can be used. Specific examples thereof include an electrolytic plating method and an electroless plating method, and an electrolytic plating method is preferable in view of productivity.

The metal contained in the second metal film 138b is not particularly limited, and known metals can be used.

The second metal film 138b may contain, for example, metals such as copper, chromium, lead, nickel, gold, silver, tin, and zinc, and alloys of the above metals.

Among these, copper or an alloy thereof is preferably contained in the second metal film 138b in view of more excellent conductive properties of the thin metal wires 38. In addition, the main component of the second metal film 138b is preferably copper in view of more excellent conductive properties of the thin metal wires 38.

The content of the metal constituting the main component in the second metal film 138b is not particularly limited, but in general, the metal content is preferably 50 to 100 mass %, and more preferably 90 to 100 mass %.

The second metal film 138b has a line width corresponding to the openings 151 of the resist film 150. Specifically, the line width is preferably less than 2.0 µm, more preferably 1.5 µm or less, and even more preferably 1.0 µm or less. The lower limit value of the line width of the second metal film 138b is preferably 0.5 µm or greater.

The line width of the second metal film 138b means a width of the thin wire in a direction orthogonal to the extending direction of the thin wire portion of the second metal film 138b.

The thickness of the second metal film 138b is not particularly limited, but in general, the thickness is preferably 300 to 2,000 nm, and more preferably 300 to 1,000 nm.

[Resist Film Removing Step]

Figure 4D:
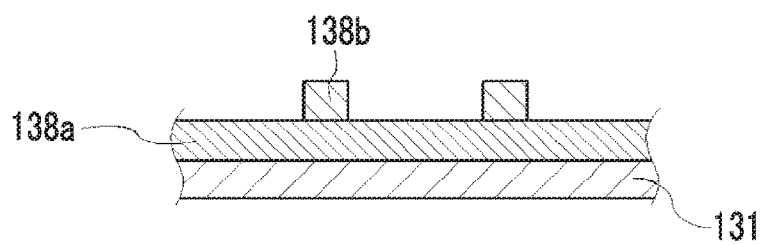
FIG. 4D is a schematic cross-sectional view for illustrating a resist film removing step.

FIG. 4D is a schematic cross-sectional view for illustrating the resist film removing step. Through this step, the resist film 150 is removed, and a laminate in which the substrate 131, the first metal film 138a, and the second metal film 138b are formed in this order is obtained.

The method of removing the resist film 150 is not particularly limited, and examples thereof include a method of removing the resist film 150 using a known resist film removing liquid.

Examples of the resist film removing liquid include an organic solvent and an alkaline solution.

The method of bringing the resist film removing liquid into contact with the resist film 150 is not particularly limited, and examples thereof include a dipping method, a paddle method, a spray method, and a dynamic dispensing method.

[Conductive Portion Forming Step]

Figure 4E:
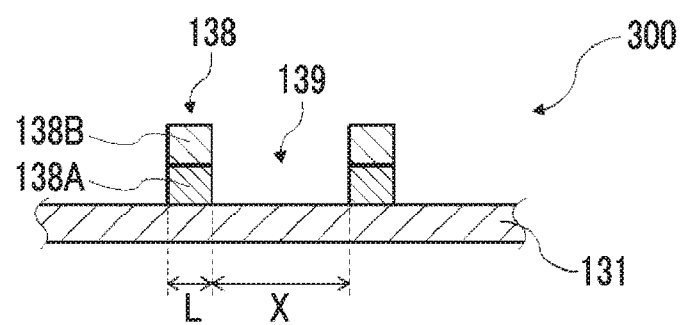
FIG. 4E is a schematic cross-sectional view for illustrating a conductive portion forming step.

FIG. 4E is a schematic cross-sectional view for illustrating the conductive portion forming step. According to this step, a part of the first metal film 138a, which is a region where the second metal film 138b is not formed, is removed, and thus a conductive film 300 in which the thin metal wires 138 are laminated on the substrate 131 is obtained. The thin metal wires 138 constitute the conductive portion 32 in FIG. 1 described above.

The thin metal wire 138 has a first metal layer 138A corresponding to the first metal film 138a and a second metal layer 138B corresponding to the second metal film 138b.

The first metal layer 138A and the second metal layer 138B are laminated in this order from the side of the substrate 131.

The method of removing a part of the first metal film 138a is not particularly limited, and known etching liquids can be used.

Examples of the known etching liquids include a ferric chloride solution, a cupric chloride solution, an ammonia alkaline solution, a sulfuric acid-hydrogen peroxide mixture, and a phosphoric acid-hydrogen peroxide mixture. Among these, an etching liquid may be appropriately selected such that the first metal film 138a is easy to dissolve and the second metal film 138b is less soluble than the first metal film 138a.

In a case where the first metal film 138a is a laminated structure as described above, the etching liquid may be changed for each layer to perform multi-step etching.

The line width of the first metal layer 138A is preferably less than 2.0 μm, more preferably 1.5 μm or less, and even more preferably 1.0 μm or less. The lower limit value of the line width of the first metal layer 138A is preferably 0.5 μm or greater.

The line width of the first metal layer 138A means a width of the thin wire in a direction orthogonal to the extending direction of the thin wire portion of the first metal layer 138A.

Since the line width of the second metal layer 138B is similar to the line width of the above-described second metal film 138b, the description thereof will be omitted.

A line width L of the thin metal wires 138 is less than 2.0 μm, preferably 1.5 μm or less, and more preferably 1.0 μm or less. The lower limit value of the line width L of the thin metal wires 138 is 0.5 μm or greater.

In a case where the line width L of the thin metal wires 138 is less than 2.0 μm, a touch panel's user is hard to visually recognize the thin metal wires 138. In a case where the line width L of the thin metal wires 138 is 0.5 μm or greater, the conductive properties of the conductive film 300 are improved.

The line width L of the thin metal wires 138 means the maximum line width of the line widths of the first metal layer 138A and the second metal layer 138B in a cross section in a width direction of the thin metal wire 138 (a cross-section orthogonal to the extending direction of the thin metal wire).

The thin metal wires 138 constitute a mesh pattern. As described above, the conductive film 300 is manufactured such that the relationship between the line width L of the thin metal wires and the opening ratio A % of the mesh pattern satisfy Formula (I) described above.

In addition, a length X (pitch size X) of one side of the opening 139 of the mesh pattern constituted by the thin metal wires 138 is as described above.

As described above, the case where the thin metal wire 138 has a laminated structure of two or more layers has been shown as a method of manufacturing the conductive film 300, but the invention is not limited thereto, and the thin metal wire may be a single layer.

In a case where the thin metal wire is a single layer, a conductive film having thin metal wires having a single layer structure can be obtained by patterning the above-described first metal film 138a by a known method.

EXAMPLES

Hereinafter, the invention will be described in more detail based on examples. Materials, amounts, ratios, treatment contents, treatment procedures, and the like used in the following examples can be appropriately changed without departing from the gist of the invention. Accordingly, the scope of the invention is not limited to the following examples.

Unless otherwise noted, parts and percentages are by mass.

Examples 1 to 4 and 7 and Comparative Examples 1, 3, 5 to 10, and 12 to 14

Conductive films of Examples 1 to 4 and 7 and Comparative Examples 1, 3, 5 to 10, and 12 to 14 were produced by a semiadditive method to be described in detail later. All the conductive films were produced in the same manner, except that a photomask having a quadrangular lattice pattern (mesh pattern) having a line width and an opening ratio shown in Table 1 was used such that a line width L (μm) of thin metal wires and an opening ratio A (%) were as shown in Table 1. The photomask has a chromium mask at a position corresponding to the opening portion of the mesh pattern of the conductive film.

First, a Cr film having a thickness of 10 nm was formed on a substrate (COP film (cycloolefin polymer film), thickness: 80 μm) using a sputtering device to obtain a base substrate metal layer. Next, a Cu film having a thickness of 50 nm was formed on the base substrate metal layer to obtain a seed layer. Hereinafter, the laminated structure of the base substrate metal layer and the seed layer is also referred to as a "first metal film".

Next, a resist film forming composition ("FHi-622BC" manufactured by FUJIFILM CORPORATION, viscosity: 11 mPa·s) was applied to the first metal film (to the seed layer) with a rotation speed of a spin coater adjusted such that a thickness after drying was 1 μm, and dried at 100° C. for 1 minute, and thus a resist film forming composition layer was obtained.

Next, a photomask in which openings having a predetermined line width as shown in Table 1 were formed was prepared and placed on the resist film forming composition layer.

Thereafter, the positive type resist film forming composition layer was irradiated with light with a wavelength of 200 to 400 nm (light source: halogen lamp, exposure amount: 16 mW/cm$^2$) for 2 seconds via the photomask using a parallel light exposure machine, and heated (post-baked) at 100° C. for 1 minute to obtain a resist film forming composition layer after exposure.

Next, the resist film forming composition layer after exposure was developed with a 0.5 M sodium hydroxide aqueous solution to obtain a resist film (film thickness: 1 μm) having openings. The openings of the resist film correspond to the exposed region.

The laminate which was produced according to the above-described procedure and in which the substrate, the first metal film, and the resist film having openings were comprised in this order was subjected to electroplating using a copper sulfate high throwing bath (containing TOP LUCINA HT-A and TOP LUCINA HT-B as additives, all manufactured by OKUNO CHEMICAL INDUSTRIES CO., LTD.). As conditions of the electroplating, the current density was 3 A/dm$^2$, and the voltage application time was 20 seconds. Through the electroplating, a mesh-patterned second metal film was formed in the openings of the resist film on the first metal film. The second metal film had a thickness of 1 μm.

Next, the resist film was peeled from the laminate using a 1 M sodium hydroxide aqueous solution.

Next, etching was performed on the first metal film using the second metal film as an etching mask. Specifically, with the second metal film as an etching mask, the region where the second metal film was not formed in the seed layer was etched using a Cu etching liquid ("Cu etchant" manufactured by FUJIFILM Wako Pure Chemical Corporation) whose concentration was adjusted such that the etching rate for the seed layer was 200 nm/min. Next, with the second metal film and the seed layer as an etching mask, the region where the second metal film and the seed layer were not formed in the base substrate metal layer was etched using a Cr etching liquid ("alkaline chromium etching liquid" manufactured by NIHON KAGAKU SANGYO CO., LTD., etching rate for the base substrate metal layer was 100 nm/min). In this manner, conductive films of Examples 1 to 4 and 7 and Comparative Examples 1, 3, 5 to 10, and 12 to 14 having a substrate and thin metal wires formed on the substrate were obtained. The thin metal wire is a laminated structure in which a first metal layer corresponding to the first metal film and a second metal layer corresponding to the second metal film are formed in this order from the substrate side.

Example 5

A conductive film of Example 5 was obtained in the same manner as in Examples 6 to 23 of the specification of U.S. Pat. No. 8,179,831B, except that the material of the thin metal wires was changed to copper. The thin metal wires formed in the conductive film of Example 5 are obtained by forming a film made of copper by a sputtering method and by then etching the film made of copper, and constitute a mesh pattern.

Example 6

A mesh pattern having a line width of 0.9 μm was formed in the same manner as in the cases of the conductive films of Examples 1 to 4 and 7, and then a second metal layer (copper) was subjected to palladium substitution as a blackening treatment.

Comparative Examples 2, 4, 11, and 15

All conductive films were produced in the same manner, except that a photomask having a line width and an opening ratio as shown in Table 1 was used such that a line width L (μm) of thin metal wires and an opening ratio A (%) were as shown in Table 1. The photomask has a chromium mask at a position corresponding to the opening portion of the mesh pattern of the conductive film.

First, components were mixed and stirred such that the mixing ratio was as follows, and thus a to-be-plated layer forming composition (hereinafter, also simply referred to as "composition") was prepared.

| | |
|---|---|
| Polyacrylic Acid | 1.35 mass % |
| Tetrafunctional Acrylamide | 0.9 mass % |
| Polymerization Initiator | 0.045 mass % |
| Fluorine-Based Surfactant | 0.015 mass % |
| Isopropanol (organic solvent) | remainder |
| Total | 100 mass % |

Details of the above components are as follows.
Polyacrylic Acid (manufactured by FUJIFILM Wako Pure Chemical Corporation, weight average molecular weight: 8,000 to 12,000)

Tetrafunctional Acrylamide (a monomer in which All "R"'s in General Formula (A) represent a methyl group, synthesized according to JP5486536B)
Polymerization Initiator (trade name "Irgacure 127", manufactured by BASF SE)
Fluorine-Based Surfactant (trade name "W-AHE" (Structural Formula (B)), manufactured by FUJIFILM CORPORATION)

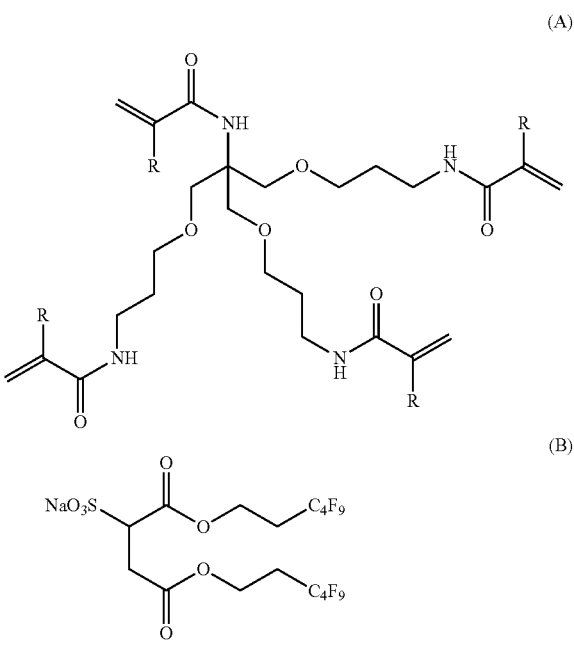

Next, a film of a composition using "W-AHE" as a fluorine-based surfactant was formed by roll coating on a substrate (trade name "LUMIRROR U48", polyethylene terephthalate film, long film, manufactured by TORAY INDUSTRIES, INC.) such that a film thickness was 600 nm. The composition was dried through an oven at 80° C. to form a to-be-plated layer forming layer on the substrate. The substrate on which the to-be-plated layer forming layer was formed as described above was wound into a roll such that the to-be-plated layer forming layer became inside.

Thereafter, the roll was unwound, and the to-be-plated layer forming layer was placed in a vacuum chamber and brought into close contact with a photomask (hard mask) having openings of a quadrangular lattice pattern (mesh pattern) in a vacuum state. Next, while the vacuum state was maintained, the layer was irradiated with light with a wavelength of 200 to 400 nm using a parallel light exposure machine (light source: halogen lamp) with an irradiation dose of 800 mJ/cm² to polymerize an exposed portion of the to-be-plated layer forming layer in the chamber.

Then, development was performed using a sodium carbonate aqueous solution to form a patterned to-be-plated layer composed of the exposed portion.

The film with a patterned to-be-plated layer was dipped for 5 minutes in a Pd catalyst imparting liquid (manufactured by Rohm and Haas) at 30° C. Next, the film was washed with water and dipped in a metal catalyst reducing liquid (manufactured by Rohm and Haas) at 30° C. Further, the film was washed with water and dipped in a copper plating liquid (manufactured by Rohm and Haas) at 30° C. for 15 minutes.

In this manner, the conductive films of Comparative Examples 2, 4, 11, and 15 having thin metal wires in which the entire area of the patterned to-be-plated layer was covered with copper plating were obtained.

Comparative Example 16

A conductive film of Comparative Example 16 was obtained in the same manner as in Examples 6 to 23 of the specification of U.S. Pat. No. 8,179,831B. The thin metal wires formed in the conductive film of Comparative Example 16 are obtained by forming a film made of gold by a vapor deposition method and by then etching the film made of gold, and constitute a mesh pattern.

[Evaluation Tests]
[Line Width L of Thin Metal Wires]

Regarding the conductive films of the examples and the comparative examples produced by the above-described method, the line width of the thin metal wires was measured by the following method.

First, the conductive film was embedded in the resin together with the whole substrate, and cut in a width direction (a direction orthogonal to the extending direction of the thin metal wire) using an ultramicrotome, carbon was deposited on the obtained cross-section, and then the carbon-deposited surface was observed using a scanning electron microscope (S-550, manufactured by Hitachi High-Technologies Corporation). The line width of each of the first metal layer and the second metal layer was measured, and the maximum line width was defined as a line width L (μm) of the thin metal wires. In a case where the thin metal wire was a single layer, the maximum line width of the thin metal wire was defined as the line width L of the thin metal wires.

(Pitch Size X of Mesh Pattern)

In a quadrangular region of 35 mm in length×35 mm in width at a central portion (a region where the conductive portion was formed) of each of the conductive films of the examples and the comparative examples, a central region of 30 mm×30 mm was divided into 9 regions of 10 mm×10 mm. Next, the pitch size of the mesh pattern in each of the divided regions was measured, and the value obtained by arithmetically averaging the pitch sizes was defined as a pitch size X (μm) of the mesh pattern.

Regarding the pitch size in the area of the 10 mm square portion (10 mm in length x 10 mm in width), the mesh pattern of the entire 10 mm square portion, which was composed of the thin metal wires, was photographed by an optical microscope, and from the image data, the pitch size X (μm) of the mesh pattern of the area was measured.

[Opening Ratio A of Mesh Pattern]

In a quadrangular region of 35 mm in length×35 mm in width at a central portion (a region where the conductive portion was formed) of each of the conductive films of the examples and the comparative examples, a central region of 30 mm×30 mm was divided into 9 regions of 10 mm×10 mm. Next, the opening ratio in each of the divided regions was measured, and the value obtained by arithmetically averaging the opening ratios was defined as an opening ratio A (%) of the mesh pattern.

Regarding the opening ratio in the area of the 10 mm square portion (10 mm in length×10 mm in width), the mesh pattern of the entire 10 mm square portion, which was composed of the thin metal wires, was photographed by an optical microscope, and from the image data, the opening ratio A (%) of the mesh pattern of the area was measured.

[Reflectivity of Thin Metal Wires]

A solid (no pattern) model film was produced under the same conditions as in the production of the conductive films of the examples and the comparative examples described above, and using a reflection spectral film thickness meter FE-3000 (manufactured by OTSUKA ELECTRONICS Co., LTD.), the reflectivity (%) of the model film at a wavelength of 550 nm was measured. Both the incidence angle and the light receiving angle were set to 90 degrees (normal incidence).

[Sheet Resistance]

A self-made jig was connected to a digital multimeter YOKOGAWA 7555 (4-wire ohms mode), and the sheet resistance of each of the conductive films of the examples and the comparative examples described above was measured. The sheet resistance was evaluated according to the following evaluation criteria.

A: Less than 10 Ω/sq
B: Not less than 10 Ω/sq and less than 20 Ω/sq
C: Not less than 20 Ω/sq

[Visibility]

Each of the conductive films of the examples and the comparative examples described above was placed on a black plate and irradiated with white light at an angle of 45 degrees to the sample surface. Each of the conductive films of the examples and the comparative examples was visually observed from just above (90 degrees) at two points, one of which was at 10 cm height and the other at 30 cm height, to evaluate the visibility according to the following evaluation criteria.

A: An excellent level at which the thin metal wires of the mesh pattern cannot be observed at all at any of 10 cm height and 30 cm height.

B: A level free of problems, at which the thin metal wires of the mesh pattern cannot be observed at 30 cm height, but wire exposure occurs from 10 cm height.

C: A level having problems at which the thin metal wires of the mesh pattern are slightly observed from any height.

D: A level having problems at which the thin metal wires of the mesh pattern are visible from any height.

[Evaluation Results]

The results of the above evaluation tests are collectively shown in the following Table 1.

TABLE 1

| | Pitch (X) (μm) | Line Width (L) (μm) | Opening Ratio (A) (%) | Reflectivity (%) | Reflectivity Measurement Object | Sheet Resistance (Ω/sq) | Visibility |
|---|---|---|---|---|---|---|---|
| Example 1 | 75 | 0.9 | 97.6 | 31 | (electroplating copper) | A | A |
| Example 2 | 75 | 1.5 | 96.0 | 31 | (electroplating copper) | A | B |
| Example 3 | 100 | 0.9 | 98.2 | 31 | (electroplating copper) | A | A |
| Example 4 | 100 | 1.5 | 97.0 | 31 | (electroplating copper) | A | B |
| Example 5 | 100 | 0.9 | 98.2 | 61 | (sputtering copper) | C | B |

TABLE 1-continued

| | Pitch (X) (μm) | Line Width (L) (μm) | Opening Ratio (A) (%) | Reflectivity (%) | Reflectivity Measurement Object | Sheet Resistance (Ω/sq) | Visibility |
|---|---|---|---|---|---|---|---|
| Example 6 | 100 | 0.9 | 98.2 | 15 | (electroless plating copper + Pd substitution) | C | A |
| Example 7 | 30 | 0.9 | 94.0 | 31 | (electroplating copper) | A | B |
| Comparative Example 1 | 75 | 2 | 94.7 | 31 | (electroplating copper) | A | C |
| Comparative Example 2 | 75 | 4 | 89.6 | 28 | (electroless plating copper) | A | C |
| Comparative Example 3 | 100 | 2 | 96.0 | 31 | (electroplating copper) | A | C |
| Comparative Example 4 | 100 | 4 | 92.2 | 28 | (electroless plating copper) | A | C |
| Comparative Example 5 | 150 | 0.5 | 99.3 | 31 | (electroplating copper) | B | D |
| Comparative Example 6 | 150 | 0.8 | 98.9 | 31 | (electroplating copper) | A | D |
| Comparative Example 7 | 150 | 0.9 | 98.8 | 31 | (electroplating copper) | A | D |
| Comparative Example 8 | 150 | 1.2 | 98.4 | 31 | (electroplating copper) | A | D |
| Comparative Example 9 | 150 | 1.5 | 98.0 | 31 | (electroplating copper) | A | D |
| Comparative Example 10 | 150 | 2 | 97.4 | 31 | (electroplating copper) | A | D |
| Comparative Example 11 | 150 | 4 | 94.7 | 28 | (electroless plating copper) | A | D |
| Comparative Example 12 | 300 | 0.9 | 99.4 | 31 | (electroplating copper) | A | D |
| Comparative Example 13 | 300 | 1.5 | 99.0 | 31 | (electroplating copper) | A | D |
| Comparative Example 14 | 300 | 2 | 98.7 | 31 | (electroplating copper) | A | D |
| Comparative Example 15 | 300 | 4 | 97.4 | 28 | (electroless plating copper) | A | D |
| Comparative Example 16 | 100 | 0.9 | 98.2 | 85 | (deposited gold) | C | C |

It has been found that in a case where Formula (I) is satisfied, the line width is 2 μm or less, and the reflectivity is 80% or less, the conductive film has good visibility (Examples 1 to 7), but in a case where the reflectivity is 20% to 40% and the line width is 1 μm or less, the conductive film has a low resistance and good visibility with particularly excellent performance (Examples 1 and 3).

Here, in Example 5, a film of sputtering copper is formed on the entire surface, and then wet etching is performed to form the thin metal wires. In a case where the thin metal wires are formed by wet etching, it is difficult to control the line width, and particularly, there is a tendency that the greater the wiring height, the more difficult it is to control the line width, unlike the semiadditive method (Examples 1 to 4) in which the line width of the thin metal wires can be controlled by the photoresist pattern. Therefore, in order to form thin metal wires having a line width of about 5 μm or less, it was necessary to produce thin metal wires having a thickness of about 100 nm (the aspect ratio (thickness/line width) of the thin metal wires of Example 5 is 0.11). Accordingly, in the conductive film of Example 5, the volume of the thin metal wires is small due to the small thickness (wiring height) of the thin metal wires, and thus the resistance is assumed not to be high as compared to the conductive films (the aspect ratio is 0.5 or greater) of Examples 1 to 4.

In Example 6, since the blackening treatment is performed to reduce the reflectivity, the copper existing on the outermost surface is substituted with palladium, and thus the resistance is assumed not to be higher than those of the conductive films of Examples 1 to 4.

It has been found that in a case where Formula (I) is not satisfied, bone exposure stands out, and there is a problem in visibility (Comparative Examples 5 to 15).

It has been found that even in a case where Formula (I) is satisfied, bone exposure occurs in a pattern having a line width of 2 μm or greater, and the visibility is not so good (Comparative Examples 1 to 4).

It has been found that even in a case where Formula (I) is satisfied and the line width is less than 2 μm, bone exposure occurs and the visibility is not so good in a case where the reflectivity is greater than 80% (Comparative Example 16).

EXPLANATION OF REFERENCES 3, 300: conductive film
31, 131: substrate
32: conductive portion
38, 138: thin metal wire
39, 139, 151: opening
L: line width
A: opening ratio
X: length of one side (pitch size)
138a: first metal film
138b: second metal film
138A: first metal layer
138B: second metal layer
150: resist film

What is claimed is:

1. A conductive film comprising:
   a substrate; and
   a conductive portion which is disposed on the substrate and composed of thin metal wires having a line width of 0.5 μm or greater and less than 2 μm,
   wherein the thin metal wires form a mesh pattern,
   a line width L μm of the thin metal wires and an opening ratio A % of the mesh pattern satisfy a relationship represented by Formula (I), $$70 \leq A < (10 - L/15)^2 \quad \text{Formula (I):}$$

wherein the thin metal wires are a laminated structure formed by laminating two or more layers,
   wherein the thin metal wires include copper or an alloy thereof, or chromium or an alloy thereof, and
   wherein a reflectivity of the thin metal wires at a wavelength of 550 nm is 20% to 40%.

2. A conductive film comprising:
   a substrate; and
   a conductive portion which is disposed on the substrate and composed of thin metal wires having a line width of 0.5 μm or greater and less than 2 μm,
   wherein the thin metal wires form a mesh pattern,
   a line width L μm of the thin metal wires and an opening ratio A % of the mesh pattern satisfy a relationship represented by Formula (I), $$70 \leq A < (10 - L/15)^2 \quad \text{Formula (I):}$$

wherein the thin metal wires are a laminated structure formed by laminating two or more layers,
   wherein the thin metal wires include copper or an alloy thereof, or chromium or an alloy thereof,
   wherein a reflectivity of the thin metal wires at a wavelength of 550 nm is 20% to 40%, and
   wherein the line width of the thin metal wires is 1 μm or less.

3. The conductive film according to claim 1, wherein the opening ratio A is 95.0% to 99.6%.

4. A touch panel sensor comprising:
   the conductive film according to claim 1.

5. A touch panel sensor comprising:
   the conductive film according to claim 3.

6. A touch panel comprising:
   the touch panel sensor according to claim 4.

7. A touch panel comprising:
   the touch panel sensor according to claim 5.

* * * * *